United States Patent Office 3,188,297
Patented June 8, 1965

3,188,297
PROCESS OF RECOVERY OF ELASTOMERS FROM SOLUTIONS WITH AN INORGANIC SULFIDE
John Leonard Snyder, Long Beach, Calif., and Godfried J. van der Bie, Delft, Netherlands, assignors to Shell Oil Company, New York, N.Y., a corporation of Delaware
No Drawing. Filed Sept. 14, 1962, Ser. No. 223,830
7 Claims. (Cl. 260—33.6)

This application is a continuation-in-part of U.S. Serial No. 25,222, filed April 28, 1960, now abandoned.

This invention relates to improved processes for the recovery of elastomers. More particularly it relates to the recovery of synthetic elastomers from hydrocarbon solution thereof.

It is known that conjugated dienes may be polymerized to produce elastomers having a high content of the cis-1,4-addition product. The more useful of the cis-1,4-addition products are those prepared from isoprene and butadiene as they have properties that make them particularly suitable for the manufacture of automobile and truck tires and other applications where natural rubber is used. The prior art directed to the polymerization of conjugated dienes to produce cis-1,4-addition products is well known and will not be described in great detail here. It is sufficient to mention that cis-1,4-polyisoprene may be produced by polymerizing isoprene with any of a large variety of hydrocarbyl lithium catalysts. Particularly preferred are the alkyl lithiums as n-butyl lithium, amyl lithium and other normal alkyl lithiums having from 2 to 10 carbon atoms. Such polymerizations are conducted at temperatures ranging from about 25° C. to about 100° C. at ambient pressures. The quantity of catalyst employed may be as low as .03 millimole per mole of isoprene and may be as high as 2 millimoles per mole of the isoprene.

The cis-1,4-polybutadiene is best prepared with a catalyst that is the reaction product of a transition metal compound, particularly halides, of the Group IV to VIII metal and a strong reducing agent. The reducing agent may be, for example, a metal compound, particularly organo-metallic, of a Group I–III metal. Of the numerous reducing agents that may be employed, organo-aluminum compounds are favored and are most often described as being useful to produce the polybutadiene having a high content of the cis-1,4-addition product. Fairly representative catalyst compositions for this purpose include the following reaction products:

$TiCl_3$—$AlEt_2Cl$  $CoCl_2$—$AlEt_2Br$
$VCl_3$—$AlEt_3$     $CoCl_2$—$AlEt_3$
$TiCl_3$—$AlEt_3$    $CoCl_2$—$AlBu_3$
$TiCl_3$—$ZnEt_2$    $ZrBr_2$—$AlBu_2Cl$
$TiCl_4$—$AlBu_2Cl$  $NiCl_2$—$AlCl_3$—$AlEt_2Cl$

Still many other combinations are known for the formation of cis-1,4-polybutadiene. As in the case of isoprene, the polymerization temperature ranges from about 25° C. to about 100° C. at ambient pressure and the mole ratios are such that more often the metal halide is present in molar excess of the organo-metallic compound.

Another class of highly useful elastomers are the copolymers of ethylene and propylene which are produced by polymerizing a mixture of the monomers with a catalyst comprising the reaction product of vanadium oxychloride and a reducing agent of the type previously described.

The elastomers are produced under conditions that exclude atmospheric impurities particularly oxygen and water. Additionally, impurities as sulfur, sulfur-containing compounds, oxygen-containing compounds, and the like are also to be excluded if a polymer is to be obtained that falls within the useful rubber range. The polymerizations are conducted in the presence of liquid inert diluents, suitably low-boiling hydrocarbons such as butane, isopentane, hexane, butenes, pentenes, gasoline, benzene, toluene and the like. As the polymerization proceeds the elastomer forms and remains in solution until it is to be recovered. The present invention provides an improved process for the recovery of elastomers from hydrocarbon solutions thereof. Before considering the invention in detail, it will be useful to a better understanding of the invention to consider some of the problems involved in the recovery of the elastomers.

The elastomers that are in solution in a hydrocarbon diluent may be recovered by adding to the solution a coagulating agent as isopropanol, ethanol, acetone, or the like, whereupon the polymer coagulates as a crumb. The crumb is recovered and then dried whereby the solvent and coagulating agent are removed. Unfortunately, much of the solvent and coagulating agent become occluded in the elastomer, and these liquids are extremely difficult to remove in an economical fashion. Removal of these liquids to about less than 1%, by weight, is necessary or else they will cause rubber products to blister and weaken during vulcanization. It is best to remove the liquids to less than 0.5%, by weight, or lower, but this must be done economically. The difficulty is that the coagulated crumb is of rather high density so that occluded liquids are extremely difficult to drive out during drying without damaging the elastomer. Furthermore, when the crumb is subjected to heat during drying it becomes tacky, thereby causing greater compacting, and holds the liquids still more firmly. More important, however, because it is necessary to remove these liquids from the elastomer by drying at elevated temperature, the elastomer is subjected to conditions which can easily cause degradation or cross linking. In order to avoid, reduce, or combat this degradation during drying, it is common to use a rubber stabilizer such as phenyl-beta-naphthylamine. This stabilizer, however, is found to be very inferior to 2,2'-methylene bis(4-methyl-6-t-butylphenol). This latter stabilizer has the disadvantage that its cost is very high, but it is used in the absence of a less costly stabilizer that is suitable. The present invention permits the use of less costly stabilizers without any sacrifice in the properties of the final product and this is an important advantage of the present invention.

It is an object of this invention to provide processes for the recovery of elastomers from hydrocarbon solutions thereof. It is another object to effect such a recovery of the elastomer as a driable crumb which is substantially free of hydrocarbon solvent. It is yet another object of this invention to recover elastomer from hydrocarbon solutions as a crumb which is substantially tack free. Still another object of this invention is to provide an elastomer crumb having improved stability which stability is achieved with a very substantial reduction in cost. Other objects will become apparent as the description of the invention proceeds.

These and other objects are accomplished by the process for the recovery of synthetic elastomers from hydrocarbon solutions thereof which comprises admixing with the hydrocarbon solution an inorganic monosulfide or hydrosulfide of an alkali metal or of $NH_4^+$, or $H_2S$, as an essential component. While the sulfide alone provides an improvement in the stability of the solid elastomers, it is of particular advantage when used together with a conventional rubber antioxidant. Many conventional rubber antioxidants are not, by themselves, sufficient to provide the desired degree of protection to synthetic elastomers during processing involving heating. The combined use of an inorganic sulfide according to this invention with a conventional rubber antioxidant, however, provides protection of the same degree as the best rubber antioxidants known and at a substantial reduction in cost.

By another embodiment of the invention a compatible oil is also admixed into the elastomer solution to produce a homogeneous blend of elastomer solution and sulfide. Thereafter the solution is treated to coagulate and recover the elastomer from the solution. The coagulated elastomer will then exist as a crumb that is substantially tack-free. A surprising finding is that the elastomer crumb is not only substantially tack-free, but it exists as distinct individual particles that facilitate complete and thorough drying. The coagulated crumb may contain substantial amounts of oil homogeneously blended into the crumb so that the present invention additionally provides a method for extending the elastomers with compatible oils. It is therefore another object of the invention to provide novel processes for extending synthetic elastomers with compatible oils, the elastomers being initially contained in hydrocarbon solutions, which solutions are stable and homogeneous at ordinary temperatures and are essentially free of water.

Synthetic elastomer is recovered according to this invention from true solution in an inert hydrocarbon diluent. Some solid component may be present in the solution, e.g., some microgel. The polymerization processes which result in the stable solutions form no part of this invention, but it is to be noted that the stable solutions are the normal form of the starting material. That is, in practice, quite important because the physical and chemical properties of the elastomers are preserved because the elastomers are not subjected to high temperatures which cause degradation while the elastomer is made fluid. In the actual practice of this invention, the concentration of the elatsomer in the solvent is immaterial although it may range from about 3 to about 35% solids, by weight, but more usually it is within the range of about 10 to 25%, by weight. Because the elastomer solution is usually quite viscous it is advantageous to put the oil into the hydrocarbon solution of the elastomer by first preparing a hydrocarbon solution of the oil in a separate vessel and mixing the thus prepared solution with the elastomer solution. However, the oil may be mixed with the elastomer solution. The mixtures of elastomer solution and compatible oil, either as a solution or in the free state, are blended until homogeneous composition is obtained.

The sulfide of the present invention is mixed into the elastomer solution at any time after the polymerization is essentially complete. If it is to be mixed together with a compatible oil, it is immaterial in what order or what manner the mixture is prepared. Generally, the sulfide will exist finely divided and evenly dispersed as a suspension in the blend but because it is present in small amounts it will not normally be visible. In some cases the sulfide will be in solution, as in the case of hydrogen sulfide dissolved in benzene. After the elastomer solution and the sulfide and optionally the oil are blended, the mixture may be recovered as a solid crumb by feeding the solution into a vessel containing hot water and/or steam at temperatures above the boiling point of the hydrocarbon solvent. Alternatively, the elastomer may be recovered by mixing the elastomer solution with a coagulating agent of the type previously described. By another modification, the sulfide may be incorporated into the coagulated crumb by adding it to the hot water or to the coagulating liquid. In this way the sulfide is incorporated into the crumb during the coagulation. This procedure, while fully operable, is less preferred because the amount of salt in the crumb is more difficult to control.

The sulfides which are used according to this invention are selected from the group consisting of hydrogen sulfide and inorganic hydrosulfides and monosulfides of alkali metals, ammonium, and alkaline earth metals. Hydrogen sulfide and those compounds which hydrolize to liberate hydrogen sulfide are most suitable. Sodium hydrosulfide is the most preferred compound. It is readily available and has been shown to give particularly good results. In general, the suitable sulfides are soluble in water and/or in the inert hydrocarbon solvents in which the elastomer is dissolved.

It is better if the system, prior to coagulation, is free of acidity; suitably the pH is from about 7.0 to 10.0. Less desirable results are obtained when the mixture of elastomer solution and sulfide, with or without the oil, has a pH in excess of 10.0 or when the solution is acid. It is preferred to adjust the pH, before coagulation, to the mildly basic region.

The inorganic sulfides which are used according to this invention are compounds which do not cause any vulcanization or cross-linking of the elastomers under the conditions of elastomer recovery from solution.

A probable explanation of the effectiveness of inorganic sulfides of this invention is that they act to prevent heavy metal contaminants from causing degradation of the elastomer during treatment, particularly treatment at elevated temperatures, such as in the drying step. Elastomer treated according to this invention generally contains some contaminating metal ions such as residues of catalyst, contaminants entering as corrosion products of the vessels and lines, and ions picked up from water which is contacted with the polymers. Typical contaminating ions are those of Li, Ti, Co, Ni, and Al, depending on the catalyst used; of Fe, Cu, Cr or the like from the vessels and lines; and of Ca, Mg, Na, K, Fe, B, Al, Cu and Sr from the water. The metal contaminants may be present in concentrations from 1 p.p.m. or less, to 200 p.p.m. or more. Even traces of many of the metals exert deleterious effect on synthetic elastomer at elevated temperatures. Particularly harmful are the heavy metals capable of existing in several valence states; this invention is of special advantage in treating polymers in the presence of such metal ions.

Typical contaminant concentrations in polyisoprene cement, expressed in p.p.m., are:

|  | Range | Preferred p.p.m. limit |
| --- | --- | --- |
| Ve | | 20 |
| Co | 0-0.1 | 0.05 |
| Cu | 0.2-1.5 | 1.0 |
| Mn | 0.2-1.0 | 0.5 |

Typical concentrations of metal contaminants in industrial water, expressed in p.p.m., are:

| | | | |
| --- | --- | --- | --- |
| Si | 9.7 | Ni | 0.019 |
| Ca | 64 | Cr | 0.0029 |
| Fe | 0.59 | K | 15 |
| Mg | 21 | Mo | 0.038 |
| B | 0.47 | Li | 0.05 |
| Al | 0.11 | Ag | 0.011 |
| Cu | 0.089 | Sr | 1.6 |
| Na | 89 | Other | Nil |
| Ti | 0.019 | | |

Actual concentrations in different cements and waters may be higher or lower.

While the above explanation of the mechanism of action of the sulfide agrees with the observed effects, this invention is not to be taken as limited by the explanation. Sulfides used in accordance with this invention may also exert other beneficial effects, e.g., in decomposing undesired peroxides which might adversely affect polymer stability.

The rubber antioxidants which are used with the sulfides of this invention are selected from the well known group of rubber antioxidants as listed, for example, in "Rubber Chemicals" by J. Van Alphen et al., Elsevier Publishing Co., 1956, 68–87. Particularly suitable antioxidants are the alkylated phenols and alkylated biphenols, e.g., Mono-tert-butyl-m-cresol,
2,6-di-tert-butyl-4-methylphenol,
Mixtures containing tris(α-methylbenzyl)phenol,
p-Phenylphenol,
Styrenated phenol,
2,2-methylene-bis(4-methyl-6-tert-butylphenol),
2,2-methylene-bis(4-ethyl-6-tert-butylphenol),
4,4-butylidene-bis(3-methyl-6-tert-butylphenol),
2,5-di-tert-amylhydroquinone;

and amines such as derivatives of aniline and substituted anilines, e.g., diphenylamine-acetone reaction product, mixtures of sym-di(3-naphthyl-p-phenylene diamine), p-isopropoxy-diphenylamine and diphenyl-p-phenylene-diamine, and N,N'-diphenyl-p-phenylene diamine, phenyl-α-naphthylamine, or sym-di-β-naphthyl - p - phenylene diamine used individually. Other useful antioxidants are heterocyclics, such as 4-phenylamine-1-methyl-1,2-dihydrobenzofurane and 1-(p-aminophenyl)-2,5-dimethyl pyrrole; chlorinated diphenyls, and metal phthalates.

Rubber antioxidants are suitably incorporated in concentrations in the range from 0.1 to 2 phr. and preferably from about 1 to 1.5 phr.

The oils that may be employed in the present processes are referred to in the art as "compatible oils" of "compatible rubber extending oils." These terms simply mean that the oil is miscible in the elastomer and after having been mixed into the elastomer it remains forever homogeneously mixed in the elastomer. This is to say that the oils do not migrate to the surface of the final product. The oils may also be termed "hydrocarbon extender oils."

Among the compatible oils are those ordinarily derived from petroleum although they may be derived from coal tar or any other suitable source. Generally, they have a viscosity of from about 10 cs. at 210° F. up to more or less solid materials softening at about 100 to 200° F., have a boiling point of at least 300° F. at 10 mm. Hg, and have a specific gravity (60/60° F.) of about 0.9 to 1.05. These are primarily higher hydrocarbons and may be vacuum distillates of petroleum as well as extracts and/or raffinates of such distillates. Also suitable are residues of petroleum distillation operations. The preferred oils are the high boiling extracts of petroleum. These extract oils are materials well known in the art. The extracts are obtained by extracting petroleum with solvents having preferential selectivity for aromatics and naphthenes. To obtain such extracts, various non-reactive, highly polar, solvents are used such as liquid sulfur dioxide, phenol, cresylic acid, furfural, beta,beta'-dichloroethyl ether, nitrobenzene and the like. Combination solvents like phenol with cresylic acid, or liquid sulfur dioxide with benzene or toluene are sometimes use. The use of the so-called double solvent process employing mutually immiscible solvents such as phenol and propane gives excellent extending oils. Many of such extracts are obtained as by-products from manufacture of lubricating oils, and thus are commercially available in very large quantities. Particular reference is made to extracts from bulk vacuum distillate fractions or cuts from California, Mid-Continent or Gulf Coast crudes used in manufacturing lubricating oils by solvent refining methods. Especially suited are extending oils of this type known as highly aromatic oils and aromatic oils by R.F.C. According to the Rostler method of analysis (Ind. Eng. Chem., 41,598 (1959)), such highly aromatic processing oils contain about 10 to 25% nitrogen bases extractable with 85% sulfuric acid, about 12 to 28% Group I unsaturated hydrocarbons extractable with 97% sulfuric acid, about 15 to 40% Group II unsaturated hydrocarbons extractable with 106.75% sulfuric acid, and about 5 to 15% saturated hydrocarbons. Similar suitable aromatic oils contain up to about 12% nitrogen bases, about 8 to 21% Group I unsaturated hydrocarbons, about 48 to 65% Group II unsaturated hydrocarbons and about 15 to 32% saturated hydrocarbons. Very suitable oils boil above about 300° F. at 10 mm. Hg pressure and contain at least 60%, by weight, of hydrocarbons extractable by sulfuric acid of about 95 to 110% strength after extraction of nitrogen bases by 85% sulfuric acid therefrom, the extractions being conducted at about 25° C.

Still another group of petroleum oils are the paraffins which may be similar to the naphthenics except that they have a higher proportion of saturates as determined by the Rostler method of analysis. In addition to the oils of the above type, a great variety of other compatible oils may be employed including rosin oil, tall oil, pine tar, cottonseed oil, wood rosin, soy bean oil, linseed oil and other compatible oils. In considering the compatible oils, it will be understood that the oil must be compatible and non-volatile at the milling temperature which may be varied within a wide range. Normally rubber milling temperatures range from about 100° F. to about 350° F., and accordingly the compatible oil is non-volatile within these temperatures.

Of all the compatible oils a few are particularly preferred because they provide the best combination of ease of processing while producing an essentially tack-free, porous, easily driable crumb which maintains a high order of stability during drying, which stability is reflected in the final product. These oils are the above described naphthenic oils and paraffinic oils. Still another advantage of the present invention is that these advantages are obtained without producing a highly stained elastomer and this will be observed to be a particularly important advantage of the present invention.

Persons skilled in this particular art will readily appreciate that the present invention is firstly concerned with improvements in the recovery of the elastomer without harming its stability because this heretofore has been a very difficult problem. However, the fact that the present processes may also be employed to extend the elastomer with oil is an added benefit which this invention affords. Thus the ultimate intended use will control the quantity of oil that is employed. In general, extending the elastomers at the production level is not undertaken because fabricators of rubber products often prefer to compound their products according to their own specifications, but the present invention, because of its simplicity and ease with which the oils are incorporated, may advantageously be used to produce custom-made oil-extended products. If the oil is to function only for the purpose of producing the tack-free, porous, easily driable crumb, small amounts of the oil are used. In this case, the oil may be as low as 0.5 part per hundred, based on the solid elastomer. Amounts in the order of about 1 to about 6 parts per hundred are preferred because a good, easily driable crumb is found to be most suitably prepared at such levels. At higher levels, the elastomer may take on aspects of an extended product which levels may range up to 300 phr. depending on the oil and elastomer. By way of illustration, cis-1,4-polybutadiene will continue to exhibit excellent characteristics even though it is extended within the order of about 200 parts of the more preferred oils. On the other hand, cis-1,4-polyisoprene can easily tolerate about 100 parts per hundred, but after that larger amounts may adversely affect the physical properties.

In considering the amount of the oil to be employed, it is first necessary to determine the solids content of the elastomer solution and this can be easily determined by removing a sample of the elastomer solution from the reactor, coagulating it with a polar solvent such as a lower alcohol or acetone, separating the solid fraction, drying and weighing it. Thereafter the amount of oil is added based on the calculated solids content.

The recovery of the elastomeric crumb from the homogeneous solution of the elastomer and the oil is simply accomplished, for example, by injecting the elastomer solution below the liquid level of a vessel containing agitated hot water. The water is at a temperature that is higher than the boiling point of the solvent of the elastomer solution. The solvent is flashed and the coagulated crumb floats to the top of the water layer where it is skimmed or recovered by other suitable means. Thereafter, the crumb may be squeezed to remove most of the water and the wet crumb is then dried. Because the oils required in the present processes have rather high boiling points they will not be leached or separated from the elastomer during the coagulating process. However, if the elastomer crumb is recovered by coagulating with a polar solvent such as a lower normally liquid alcohol, acetone, or the like, some of the oil may be dissolved in the coagulating medium. Depending upon the temperature of this coagulating medium and/or the residence time of the crumb in the medium, the amount of oil that can be removed may be substantial. However, a surprising finding of the present invention is that the crumb is still recovered in a form which is essentially tack-free, porous and readily driable even though oil may be leached by the polar coagulation agent. The reasons for this are not understood and it appears that the presence of the oil after the coagulation step is not needed in order to maintain the drying properties of the elastomer. This finding, however, is of no practical significance if the elastomer is to contain large amounts of the oil as an extender in which event coagulation with the polar liquids will not be employed. Further, the cost of recovery with polar solvents is somewhat higher than recovery by injecting in hot water.

The amount of the sulfide employed for the purposes of the present invention may be varied a great deal depending upon the formulation in which it is used. Amounts as low as 0.001 phr. of elastomer may be adequate. In other cases amounts as high as 5.0 phr. may be usefully employed. Generally, however, the amount will not exceed about 2 phr. Preferred amounts are in the range from 0.01 to 0.5 phr. Further, the choice of the oil, the choice of the specific stabilizer of this invention, the choice of the conventional stabilizers and the nature of the elastomer involved will all affect, in one way or another, the results that are ultimately obtained. Nevertheless, it is another advantage of the present invention that highly desirable results are obtained with small amounts of the sulfide, which may be favorably affected by the presence of the more preferred oils. This is shown in the following examples and data which are presented for purposes of illustration only, and it will be appreciated that considerable variation may be undertaken in accordance with the previous disclosure.

EXAMPLE I

To an isopentane solution of cis-1,4-polyisoprene, having a solids content of 10% and a cis-1,4-content of 93.2%, is added 1.0 phr. of naphthenic oil, having the trade name "Dutrex 33," and 0.1 phr. of sodium hydrosulfide together with 1 phr. of Agerite Superlite, a rubber antioxidant. The mixture is blended for 3–5 hours until a uniform composition is obtained. Thereafter the elastomer solution, containing the oil and the sodium hydrosulfide, is injected into a vessel containing water at a temperature of 90° C., whereupon the elastomer floats to the top of the vessel containing the hot water. The floated elastomer is recovered by skimming, drained to remove most of the water and then passed through a moving belt drier at 75–80° C. for 2–3 hours. In other cases other known rubber stabilizers are added together with the oil and the stabilizing salt and the results are shown below. Table I summarizes data that will show that the compositions of this invention will produce highly useful products.

*Table I*

Elastomer composition:
"Agerite Superlite," phr. _____ 1.0
Oil, Dutrex 33, phr. _____ 1.0
Stabilizing salt, NaHS, phr. _____ 0.1
Cis-1,4-content _____ 92.3
ML–4 _____ 53.0
I.V. _____ 8.5
Cleavage on milling _____ Slight
Mixed uncured compound:
  Ml–4 (Mill mix)—
    Tread compound _____ 55
    Carcass compound _____ 35
Banbury mixing characteristics:
  No peptising premix _____ Fair
  0.5 phr. Pepton 65 Premix (zinc 2-benzamidothiophenate) _____ Good
Tread compounds:
  Goodrich Flexometer heat buildup, ° F., 158° F.—
    25'/292° F. _____ 30
    45'/292° F. _____ 32
  Yerzley resilience, percent rebound _____ 67
  Angle tear strength, PIW—
    20'/292° F. _____ 290
    40'/292° F. _____ 240
  Hot tensile strength, p.s.i., 212° F.—
    20'/292° F. _____ 2200
    40'/292° F. _____ 1920
Carcass compounds:
  Goodrich Flexometer heat buildup, ° F., 158° F.—
    25'/292° F. _____ 10
    45'/292° F. _____ 11
  Yerzley resilience, percent rebound _____ 81
  Angle tear strength, PIW
    20'/292° F. _____ 210
    30'/292° F. _____ 200
  Hot tensile strength—
    20'/292° F. _____ 1110
    30'/292° F. _____ 1130

Cured compounds (at 292° F.):

| Cure time | Carcass | | Tread Stock | |
|---|---|---|---|---|
| | Tensile, p.s.i. | 300% modulus | Tensile, p.s.i. | 300% modulus |
| 10' | 3,380 | 620 | 3,380 | 1,320 |
| 20' | 3,140 | 960 | 3,210 | 1,760 |
| 30' | 2,680 | 1,000 | 3,180 | 1,840 |
| 40' | 2,620 | 980 | 3,100 | 1,820 |
| 50' | 2,660 | 920 | 3,100 | 1,780 |
| 60' | 2,700 | 820 | 3,160 | 1,720 |

The formulation of the carcass and tread stock are as follows:

| | Carcass | Tread |
|---|---|---|
| Cis-1,4-polyisoprene | 100 | 100 |
| Carbon black, FEF | 30 | |
| Carbon black, HAF | | 50 |
| BLE [1] | 1 | 1 |
| Agerite HP [2] | 0 | 0.2 |
| Zinc oxide | 5 | 5 |
| Stearic acid | 3 | 3 |
| Pine tar | 5 | 5 |
| Sulfur | 2.75 | 2.75 |
| Santocure [3] | 1 | 1 |

[1] Diphenylamine-acetone reaction product.
[2] 50 parts sym-di(β-naphthyl-p-phenylene-diamine). 25 parts p-isopropoxy diphenylamine. 25 parts diphenyl-p-phenylene-diamine.
[3] Benzothiazyl-2-monocyclohexyl sulfenamide.

In order to demonstrate further the improved stability afforded by the present invention, Table II provides comparative data which illustrates that a number of other conventional rubber stabilizers may be used.

Table II

| Naphthenic extending oil,[1] 1 phr. Stabilizer, 1 phr. | Intrinsic viscosity | | | | |
|---|---|---|---|---|---|
| | NaHS phr. | Reactor product | Dried crumb | Crumb aged at 80° C. | |
| | | | | 10 hrs. | 20 hrs. |
| None | 0.5 | 8.4 | | | 2.5 |
| Do | 1.0 | | | 3.9 | 3.0 |
| 2,2-methylene-bis (4-ethyl-6-tert-butylphenol) | 1.0 | | | 6.1 | 5.9 |
| Agerite Superlite[2] | 0 | 9.4 | 8.4 | 3.4 | Liq. |
| Do | 0.1 | 9.4 | 9.0 | 7.7 | 6.5 |
| Santowhite L.[3] | 0 | 9.4 | 7.5 | 2.3 | Liq. |
| Do | 0.1 | 9.4 | 8.0 | 6.5 | 4.6 |
| Phenyl-beta-naphthylamine | 0 | 9.4 | 8.3 | 5.0 | 4.2 |
| Do | 0.1 | 9.4 | 8.5 | 6.7 | 5.8 |
| 2,2'-methylene bis (4-methyl-6-tert-butyl phenol) | 0 | 9.4 | 8.6 | 6.8 | 6.5 |
| Do | 0.01 | 8.4 | 8.4 | 8.0 | 7.1 |
| Do | 0.05 | 8.4 | 8.4 | 7.9 | 7.2 |
| Do | 0.1 | 8.4 | 8.4 | 8.1 | 7.3 |
| Do | 0.5 | 8.4 | 8.3 | 7.6 | 7.4 |
| 2,2'-methylene bis (4-methyl-6-tert-butyl phenol) (added to the coagulating water) | 0.1 | 8.4 | 8.4 | 8.2 | 6.7 |
| Naugawhite[4] | 0 | 6.9 | 6.8 | 5.7 | 4.8 |
| Do | 0.05 | 6.9 | 6.6 | 6.2 | 6.1 |

[1] Dutrex 33.
[2] A butylated bisphenol.
[3] Reaction product of 6-tert-butyl-meta-cresol and sulfur dichloride.
[4] An alkylated bis-phenol.

EXAMPLE II

Into a solution of elastomeric ethylene-propylene copolymer is bubbled gaseous hydrogen sulfide for several minutes. Thereafter the solvent is flashed by injecting the solution into hot water. The recovered crumb is then dried. It is found that the treatment with the hydrogen sulfide considerably improves the stability of the elastomer during the drying. In companion experiments, still better results are obtained when the elastomer solution is blended with an extending oil and known rubber antioxidants such as PBNA and alkylated phenols prior to the coagulation. Generally, the naphthenic oils give better stability than the aromatic or aliphatic extending oils.

Although the invention is illustrated with rather specific embodiments, it will be found that essentially the same results are obtained by the modifications described above. Although some variations will generally be exhibited when formulations are modified, such modifications will be found to be minor. Thus, for example, when potassium hydrosulfide is substituted for the corresponding sodium salt, the intrinsic viscosity may be slightly lower but this can be offset by increasing the amount of the proper extending oil. Similarly, the use of other sulfides and extending oils may reflect themselves in the physical properties of the cured elastomers. However, whenever inferior properties are observed in preliminary or screening experiments, persons skilled in the art of rubber chemistry will readily understand that these properties can be modified considerably by simply modifying the formulation.

For purposes of describing and claiming this invention the term substantially cis-1,4-polyisoprene means a polyisoprene containing at least about 90% cis-1,4 structure.

Numerous modifications in the selection of specific compounds and of operating conditions can be made within the scope of this invention.

We claim as our invention:

1. The process comprising
   (1) mixing a solution of synthetic substantially cis-1,4-polyisoprene elastomer in a low-boiling aliphatic hydrocarbon solvent, contaminated with trace amounts of metals, with
      (a) about 1 phr. of N-phenyl-beta-naphthylamine,
      (b) about 0.1 phr. of sodium hydrosulfide, and
      (c) about 1 phr. of a compatible naphthenic rubber-extending oil,
   (2) injecting the mixture into water maintained at about 90° C., whereby said rubber is converted to solid crumbs,
   (3) recovering said elastomer crums, and
   (4) drying said elastomer crums at about 75–80° C.

2. The process comprising
   (1) mixing a solution of synthetic conjugated diene hydrocarbon elastomeric homopolymer contaminated with trace amounts of metals, in an inert, normally liquid hydrocarbon solvent in which it is soluble at ambient temperature, with
      (a) from 0.1 to 2 phr. of a rubber antioxidant of the group consisting of phenols and aromatic amines, and
      (b) from 0.001 to 2 phr. of sodium hydrosulfide,
   (2) coagulating the elastomer to solid crumbs,
   (3) separating elastomer crumbs from solvent, and
   (4) drying said elastomer crumbs at an elevated temperature.

3. The process comprising
   (1) mixing a solution of synthetic conjugated diene hydrocarbon elastomeric homopolymer contaminated with trace amounts of metals, in an inert, normally liquid hydrocarbon solvent in which it is soluble at ambient temperature, with
      (a) a rubber antioxidant of the group consisting of phenols and aromatic amines, and
      (b) from 0.001 to 2 phr. of a sulfide that is selected from the group consisting of hydrogen sulfide, and hydrosulfides of alkali metals the mixture so formed having a pH of 7–10,
   (2) injecting the mixture into hot water whereby the solvent is flashed off and the elastomer is converted into solid crumbs, and
   (3) recovering and drying solid elastomer.

4. The process of claim 3 wherein the sulfide is sodium hydrosulfide.

5. The process of claim 3 wherein the elastomer is a member of the group consisting of substantially cis-1,4-polyisoprene and substantially cis-1,4-polybutadiene.

6. The process comprising
   (1) mixing a solution of synthetic conjugated diene hydrocarbon elastomeric homopolymer contaminated with trace amounts of metals, in an inert normally liquid hydrocarbon solvent in which it is soluble at ambient temperature, with (a) a rubber antioxidant of the group consisting of phenols and aromatic amines,
(b) from 0.001 to 2 phr. of a sulfide that is selected from the group consisting of hydrogen sulfide and hydrosulfides of alkali metals, and
(c) a compatible rubber-extending oil, (2) injecting the mixture into hot water whereby the solvent is flashed off and the elastomer is converted into solid crumbs, and (3) recovering and drying solid elastomer.

7. The process of claim 6 wherein the sulfide is sodium hydrosulfide.

References Cited by the Examiner
UNITED STATES PATENTS

| | | | |
|---|---|---|---|
| 2,599,544 | 6/52 | Crouch et al. | 260—45.7 |
| 3,081,276 | 3/63 | Snyder et al. | 260—33.6 |

MORRIS LIEBMAN, *Primary Examiner.*